(12) United States Patent
Jones, Jr. et al.

(10) Patent No.: US 6,552,749 B1
(45) Date of Patent: Apr. 22, 2003

(54) METHOD AND APPARATUS FOR VIDEO MOTION COMPENSATION, REDUCTION AND COLOR FORMATTING

(75) Inventors: Morris E. Jones, Jr., Saratoga, CA (US); Ying Cui, Palo Alto, CA (US); Chairong Li, Sunnyvale, CA (US); Everitt Kwocktong Chock, Fremont, CA (US); Zudan Shi, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/240,228

(22) Filed: Jan. 29, 1999

(51) Int. Cl.⁷ .............................. H04N 7/01; H04N 7/26
(52) U.S. Cl. ................... 348/441; 348/390.1; 348/444; 348/451; 348/699; 348/715
(58) Field of Search ................... 348/441, 444, 348/453, 451, 452, 445, 407.1, 413.1, 416.1, 439.1, 699, 387.1, 714, 715, 390.1; 375/240.16, 240.17, 240.21; 382/232, 235, 236, 298, 299; H04N 7/01, 7/26

(56) References Cited

U.S. PATENT DOCUMENTS

| | | | |
|---|---|---|---|
| 4,486,785 A | 12/1984 | Lasher et al. | 358/284 |
| 5,136,385 A | 8/1992 | Campbell | 358/160 |
| 5,265,180 A | 11/1993 | Golin | 382/56 |
| 5,398,079 A | * 3/1995 | Liu et al. | 348/699 |
| 5,428,456 A | 6/1995 | Parulski et al. | 358/340 |
| 5,613,052 A | 3/1997 | Narayanaswami | 395/134 |
| 5,699,277 A | 12/1997 | Munson et al. | 364/514 |
| 5,784,115 A | 7/1998 | Bozdagi | 348/452 |
| 5,874,937 A | 2/1999 | Kesatoshi | 345/127 |
| 6,061,094 A | 5/2000 | Maietta | 348/446 |
| 6,104,434 A | * 8/2000 | Nakagawa et al. | 375/240.16 |
| 6,208,350 B1 | * 3/2001 | Herrera | 345/430 |
| 6,249,549 B1 | * 6/2001 | Kim | 375/240.21 |
| 6,252,906 B1 | * 6/2001 | Canfield | 375/240.21 |
| 6,256,347 B1 | * 7/2001 | Yu et al. | 375/240.13 |
| 6,256,349 B1 | * 7/2001 | Suzuki et al. | 375/240.18 |

* cited by examiner

Primary Examiner—John Miller
Assistant Examiner—Jean W. Désir
(74) Attorney, Agent, or Firm—Thelen Reid & Priest LLP; John P. Schaub

(57) ABSTRACT

A method and apparatus for video motion compensation, power of two reduction and color format conversion is disclosed. The motion compensation engine performs the MPEG-2 functions of half pel compensation, inverse discrete cosine transform and merge. Dual prime, field-based and frame-based macroblocks are supported. Data reduction may be performed in the vertical direction, the horizontal direction, or both.

35 Claims, 12 Drawing Sheets

Vertical Half Pel Compensation

METHOD AND APPARATUS FOR VIDEO MOTION COMPENSATION, REDUCTION AND COLOR FORMATTING

BACKGROUND OF THE INVENTION

1. Field of the Invention

The present invention relates to video decoding systems. More particularly, the present invention relates to a method and apparatus for performing motion compensation, data reduction, and color format conversion.

2. Background

During the last several years, advances in electronic communications systems have greatly improved the way in which people exchange information. The advances in real-time video systems have proceeded at a particularly fast pace. Services such as multi-party interactive games, video teleconferencing, and video-on-demand are being developed. These and other video services will require cost-effective video decoders.

There are several standards which provide an efficient way to represent image sequences in the form of compact coded data. At present, two MPEG standards predominate. The MPEG-1 standard handles, data at 1.5 Mbits/second and can reconstruct video frames at 30 Hz. Each frame has a resolution of 352 pixels by 240 lines in the NTSC video standard and 352 pixels by 288 lines in the PAL video standard.

The MPEG-2 standard was created due to the need to efficiently represent broadcast video. According to the MPEG-2 standard, 720 pixels per line by 480 lines are displayed for NTSC. The PAL resolution is 720 pixels per line by 576 lines. Decoding MPEG-2 video data requires several steps including inverse discrete cosine transform, half pel (pixel) compensation, and merge prediction. These functions are described in the ISO MPEG-2 Standard Document ISO/IEC 13818-2: 1995(E).

In multimedia products for the personal computer, video processing is typically distributed among several applications. These applications include a video capture engine, a motion compensation engine, and an overlay engine. Each of the applications interfaces with a frame buffer to read and/or write video data. The frame buffer picture elements (pixels) comprise a rectangular grid of image data that are filtered, stored and displayed using multiple color spaces: red, green and blue (RGB) is often used for graphic data; and the luminance/chrominance (Y, UV) format is often used for full-motion is video data. Due to memory bandwidth limitations, it is desirable to decrease the amount of frame buffer accesses.

Some motion compensation engines interface with frame memory to read input data, store intermediate data, and store motion compensated data. The high amount of frame memory accesses decreases the available memory bandwidth for other video applications, resulting in degraded performance.

Also, most motion compensation systems input frame data according to one color format and use a different color format for display. Typically, the input format is YUV 4:2:0. Video data in this format is typically converted to YUV 4:2:2 format after motion compensation is performed. The YUV format conversion is typically performed in an application separate from the motion compensation unit. Separating the color format conversion requires additional frame memory accesses to read the motion compensated data from frame memory and write the YUV reformatted data back to frame memory.

Furthermore, video data must often be reduced at some time after motion compensation and prior to display. The data may be reduced to due to memory bandwidth limitations, or to display a source image having a different size than the display size. A typical video system reduces the data just prior to display, requiring an unnecessarily large amount of data to be handled in the earlier stages of video processing.

Separating data reduction and color format conversion from the motion compensation engine increases memory bandwidth requirements and requires extra hardware to implement. A need exists in the prior art for a motion compensator, data reducer and color format converter which eliminates hardware redundancies and minimizes frame buffer accesses while maintaining image quality.

BRIEF DESCRIPTION OF THE INVENTION

The present invention provides a method and apparatus for video motion compensation, data reduction and color format conversion such that frame memory references are minimized. Motion compensation can be provided to reconstruct video frames from compressed video data. Data reduction may also be employed to reduce the amount of video data written. In addition, video data may be converted from one color format to another.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

The invention relates to MPEG compliant video decoders. More particularly, the invention relates to a method and apparatus for performing functions including motion compensation, data reduction and color format conversion.

The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

Since the present invention preferably implements parts of the MPEG-2 video decoding algorithm, ISO/IEC 13818-2:1995(E), an overview of some aspects of the algorithm will now be presented.

Digital video systems represent an image as rows of pixels. For each frame that is transmitted, there is a previous frame. The previous frame is made by compressing and decompressing the preceding video frame. The current video frame is predicted based upon the previous frame. This prediction is done by estimating the movement of each block in the current frame with respect to the previous frame.

A picture is defined as a frame having a grid of 720×480 pixels. A "slice" is defined as a series of one or more groups of macroblocks aligned in horizontal rows within a frame. A macroblock is a 16×16 block of pixels. A "4:2:0" macroblock includes six 8×8 blocks containing pixel data, four of which contain luminance data and two of which contain chrominance data. There is a one-to-one correspondence between macroblock pixels and luminance block pixels. However, the 64 (8×8) chrominance values are evenly distributed among the region covered by the 256 (16×16) macroblock pixels.

A "4:2:2" macroblock includes four blocks containing luminance data and four blocks containing chrominance data. Like 4:2:0 format, there is a one-to-one correspondence between macroblock pixels and luminance block pixels. The 128 (2×8×8) chrominance values are evenly distributed among the region covered by the macroblock pixels.

Figure 1:
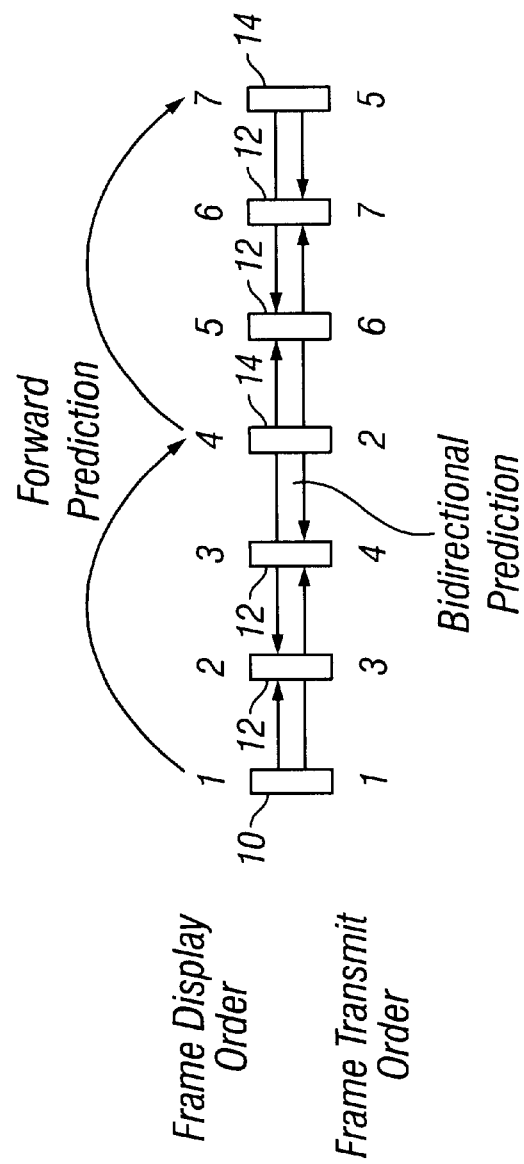
FIG. 1 illustrates MPEG-2 I, B and P pictures.

Turning now to FIG. 1, three types of macroblocks are illustrated. "I" (Intra) macroblocks 10 are encoded and transmitted as is. "P" (predicted) macroblocks 12 are formed by motion vectors from a previous picture and can serve as a source of motion vectors for other pictures. The third type of macroblock is the "B" (bidirectional) macroblock 14. "B" macroblocks 14 are formed by motion vectors from a macroblock in a past frame and a macroblock in a future frame. "B" macroblocks 14 cannot serve as a source of motion vectors. Motion vectors are generated from "P" 12 and "I" 10 macroblocks. These motion vectors are used to form "P" 12 and "B" 14 macroblocks.

Motion compensation is employed to reduce or eliminate redundancy between picture frames. Motion compensation divides current pictures into blocks and then searches previously transmitted pictures for another block nearby having similar pixel values. In the encoding process, pixel-by-pixel differences between the current macroblock and the closest macroblock are transformed by Discrete Cosine Transform (DCT) processing. The resultant DCT coefficients are quantized and variable-length entropy coded and transmitted together with the motion vectors for the macroblock. In the decoding process, an Inverse Discrete Cosine Transform (IDCT) converts the coefficients to pixel data via a two dimensional inverse transform. This reconstructed picture data is saved as reference data for subsequent picture coding.

The motion vectors used to form "P" 12 and "B" 14 macroblocks also contain an indication of whether "half pel compensation" must be performed. Half pel compensation may be done in the vertical direction, the horizontal direction, or both. Movement of a block from frame to frame is represented by a vector that has a horizontal and a vertical component. When both the horizontal and vertical components of the vector are a whole number of pixels, a motion compensated block is obtained by shifting a block of pixels from the uncompensated block in the direction and magnitude specified in the vector.

When the motion estimator generates displacement vectors that are not whole numbers, the motion compensated blocks are obtained by shifting the block a truncated number of pixels, and then averaging each pixel with its neighboring pixel. For example, if the horizontal component of the displacement vector is 2.5, the block is shifted two pixels, and each pixel is averaged with its neighboring pixel to the right.

Figure 2:
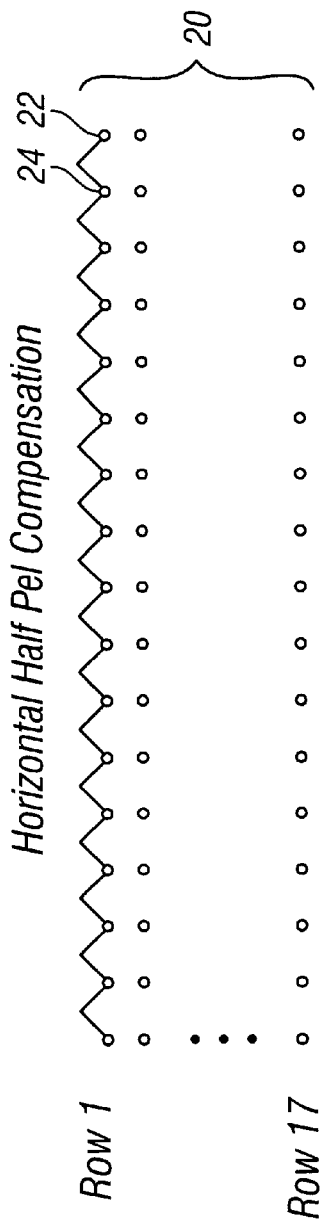
FIG. 2 illustrates horizontal half pel compensation.

Referring now to FIG. 2, horizontal half pel compensation is illustrated. A 17×17 macroblock 20 is required to create a 16×16 half pel compensated macroblock. Horizontal half pel compensation removes one column of a 17×17 macroblock 20. This is done by averaging consecutive sets of two pixels. A first pixel 22 is averaged with a second pixel 24 to the left. This process continues for each remaining pair of adjacent pixel values in the top row, resulting in sixteen averaged pixels. The process is repeated for the remaining rows.

Figure 3:
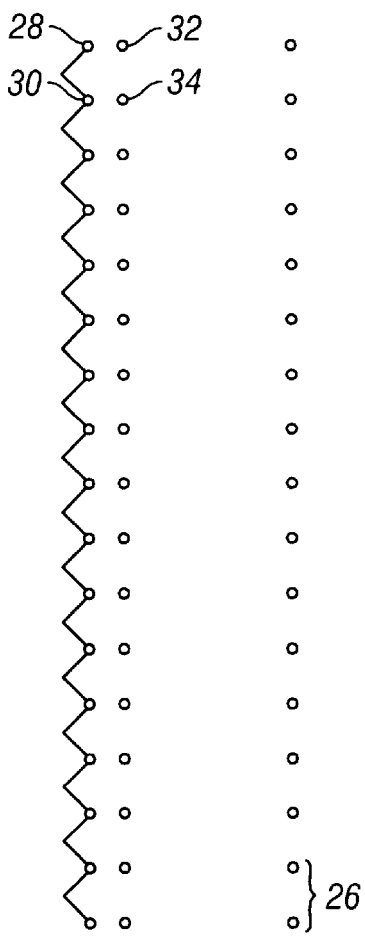
FIG. 3 illustrates vertical half pel compensation.

Referring now to FIG. 3, vertical half pel compensation is illustrated. The seventeenth row 26 is removed by performing vertical half pel compensation. This is done by averaging adjacent values in each column. A third pixel 28 is averaged with a fourth pixel 30 below the third pixel 28. Next, a fifth pixel 32 is averaged with a sixth pixel 34 below the fifth pixel 32. This process continues for each pair of vertically adjacent pixel values. Vertical pixel averaging continues for the remaining sixteen rows.

If both vertical and half pel compensation must be performed, a whole block may be vertically reduced, followed by horizontal reduction of the result. Alternatively, horizontal reduction may be interleaved with vertical reduction. When the process is complete, a 17×17 block of pixel values will have been transformed to a 16×16 standard macroblock. The 16×16 macroblock is then used to reconstruct the current picture by adding any Inverse Discrete Cosine Transform (IDCT) difference data.

The use of a 17×17 block of pixels 20 in the examples above is not intended to be limiting in any way. Those of ordinary skill in the art will recognize that other formats may be employed. For example, if only vertical half pel compensation is required, only a 17×16 block of pixels need be read.

Each macroblock also contains an indication of whether the macroblock is from a field or a frame. A frame contains all the pixels in an MPEG-2 picture. A field contains only half of the rows of pixels appearing in a full frame. One field contains the odd numbered rows. The other field contains the even numbered rows. Video systems often display fields at 60 Hz, for an effective display rate of 30 Hz. Each macroblock also contains an indication of whether the macroblock is "dual prime". This type of macroblock is only used with P pictures that have no B pictures between the predicted and reference fields of frames. Whether a macroblock is dual prime, field based, or frame based affects how such motion compensated blocks are stored. This will be described further below.

Figure 4:
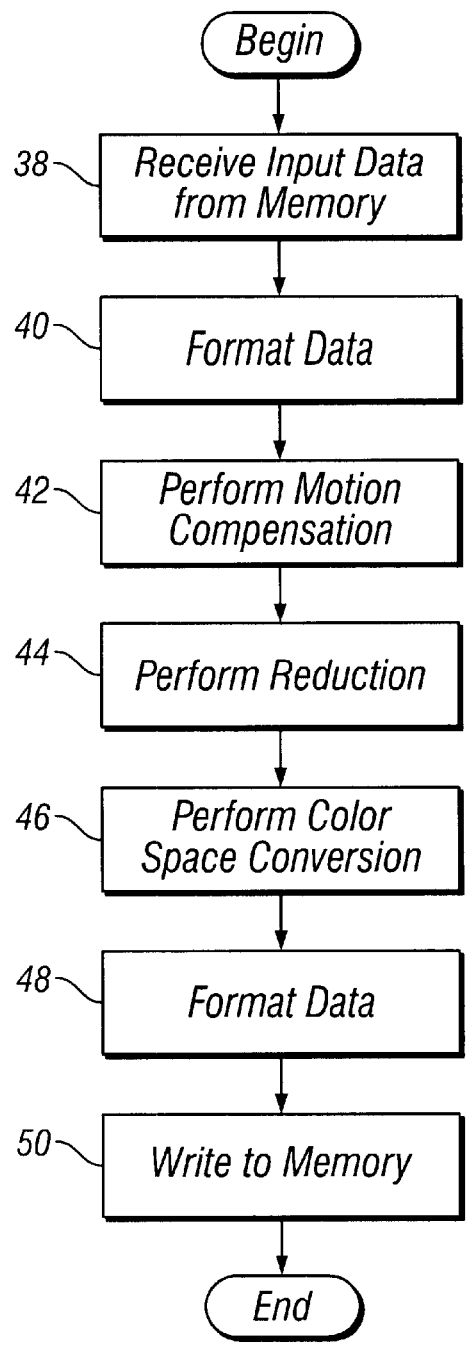
FIG. 4 is a flow diagram illustrating motion compensation, data reduction and color format conversion in accordance with the present invention.

FIG. 4 is a high level flow diagram illustrating the method by which motion compensation, data reduction and color format conversion are performed in accordance with the present invention. At reference numeral 38, a macroblock is received. At reference numeral 40, the input data is put into a format acceptable to the motion compensation engine. At reference numeral 42, motion compensation is performed when required. At reference numeral 44, data reduction is performed on the motion compensated data when required. According to one embodiment, power of two data reduction is performed. However, one of ordinary skill in the art will recognize that other types of data reduction may be performed, including pixel dropping. At reference numeral 46, color format conversion is performed. According to one embodiment, YUV 4:2:0 data is reformatted to YUV 4:2:2 data. At reference numeral 48, the chrominance and luminance values are interleaved. At reference numeral 50, the reformatted data is written to frame memory.

Figure 5:
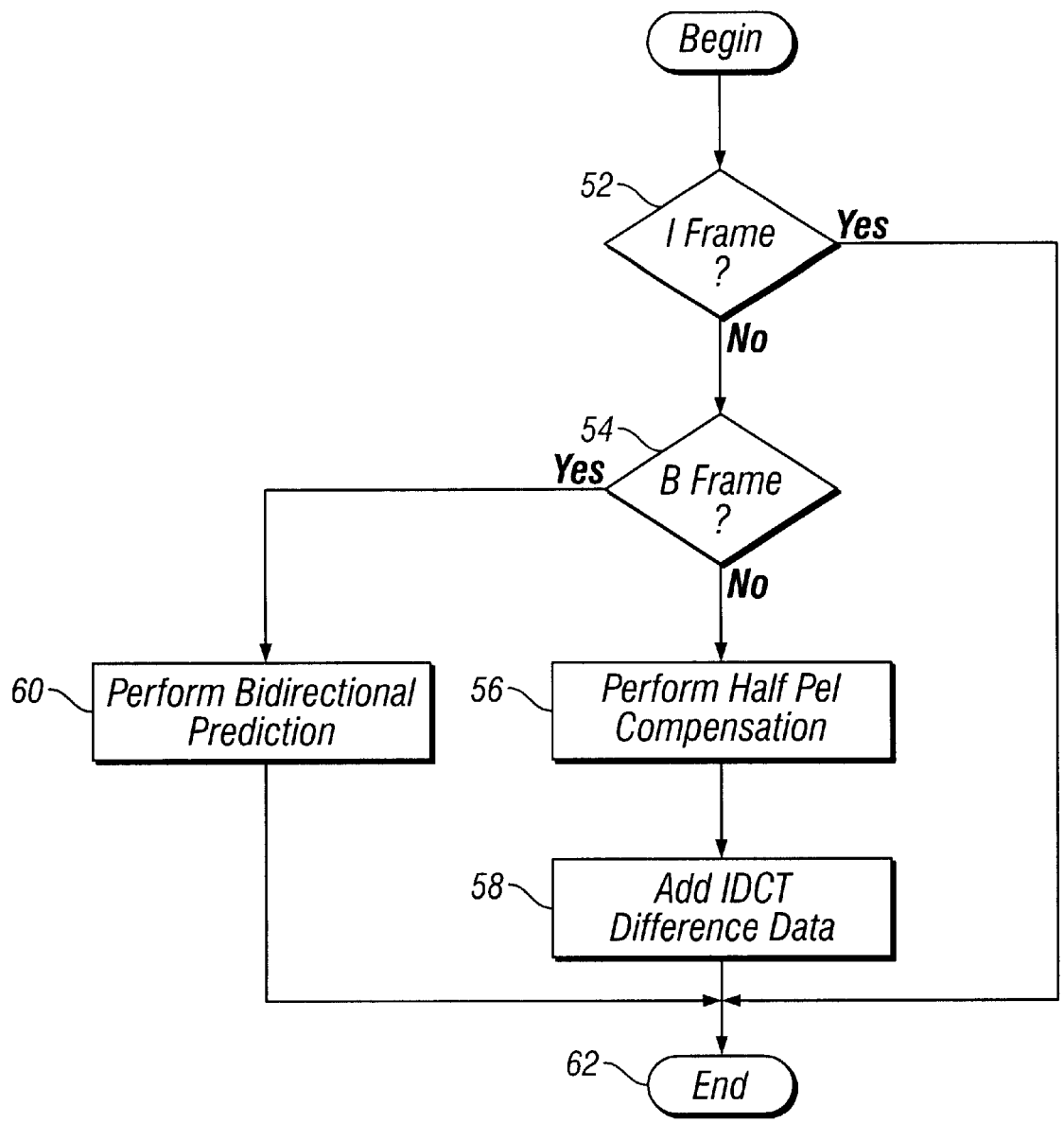
FIG. 5 is a flow diagram illustrating motion compensation in accordance with the present invention.

Turning now to FIG. 5, a detailed flow of motion compensation is presented. At reference numeral 52, a check is made to determine whether the current frame is an I frame. If the current frame is an I frame, motion compensation is not required and execution terminates at reference numeral 62. If the current frame is not an I frame, a check is made to determine whether the frame is a B frame at reference numeral 54. If the current frame is a B frame, motion compensation for bidirectional frames is performed at reference numeral 60. If the current frame is not a B frame, motion compensation for P frames is performed. Motion compensation for P frames includes half pel compensation at reference numeral 56, followed by adding IDCT difference data at reference numeral 58.

Figure 6:
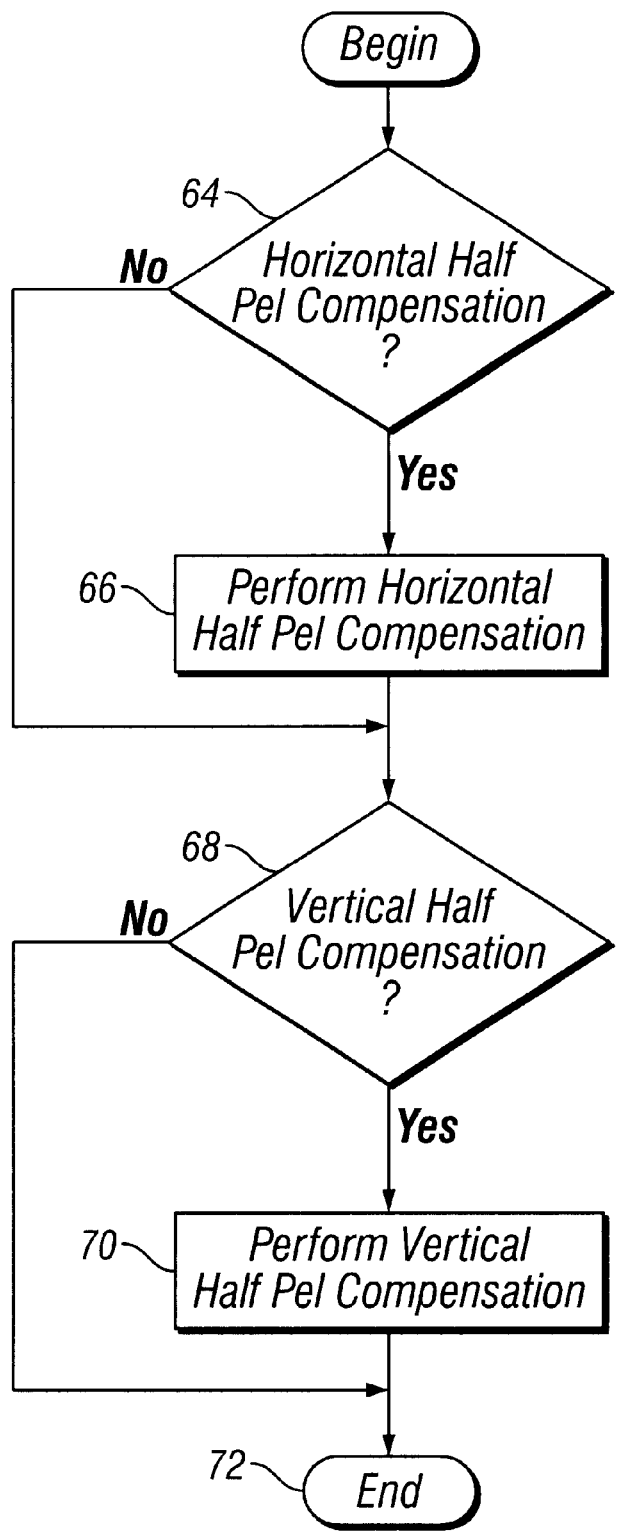
FIG. 6 is a flow diagram illustrating half pel compensation in accordance with the present invention.

Turning now to FIG. 6, a method for performing half pel compensation is presented. At reference numeral 64, a check is made to determine whether horizontal half pel compensation is required. If it is not required, execution continues at reference numeral 68. If it is required, it is performed at reference numeral 66. At reference numeral 68, a check is made to determine whether vertical half pel compensation is required. If it is not required, execution terminates at reference numeral 72. If it is required, it is performed at reference numeral 70.

Figure 7:
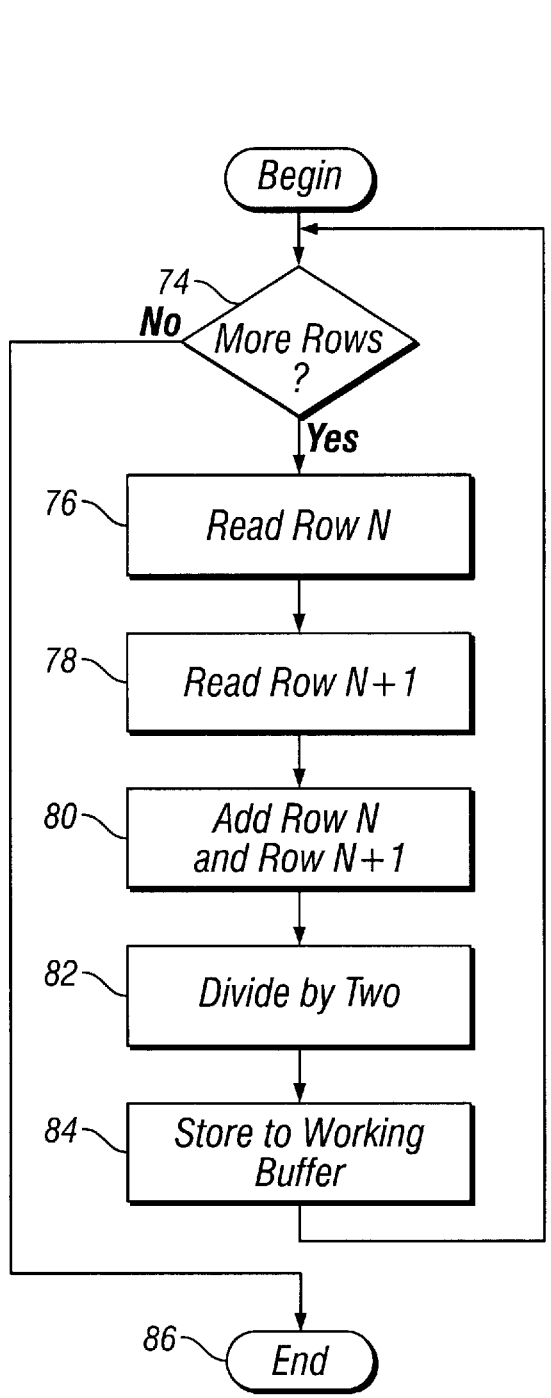
FIG. 7 is a flow diagram illustrating vertical half pel compensation in accordance with the present invention.

Turning now to FIG. 7, a method for half pel compensation in the vertical direction is presented. The method performs vertical half pel compensation by summing pairs of pixel values for consecutive rows and dividing the resultant pixel values by two. At reference numeral 74, a check is made to determine whether more rows should be read. If no more rows should be read, execution ends at reference numeral 86. If more rows must be read, two more rows are read. A first row is read at reference numeral 76 and a second row is read at reference!numeral 78. At reference numeral 80, the pixel values for the two rows are added together. At reference numeral 82, the summed pixel values are divided by two. The result of the division is stored in a working buffer at reference numeral 84.

Figure 8:
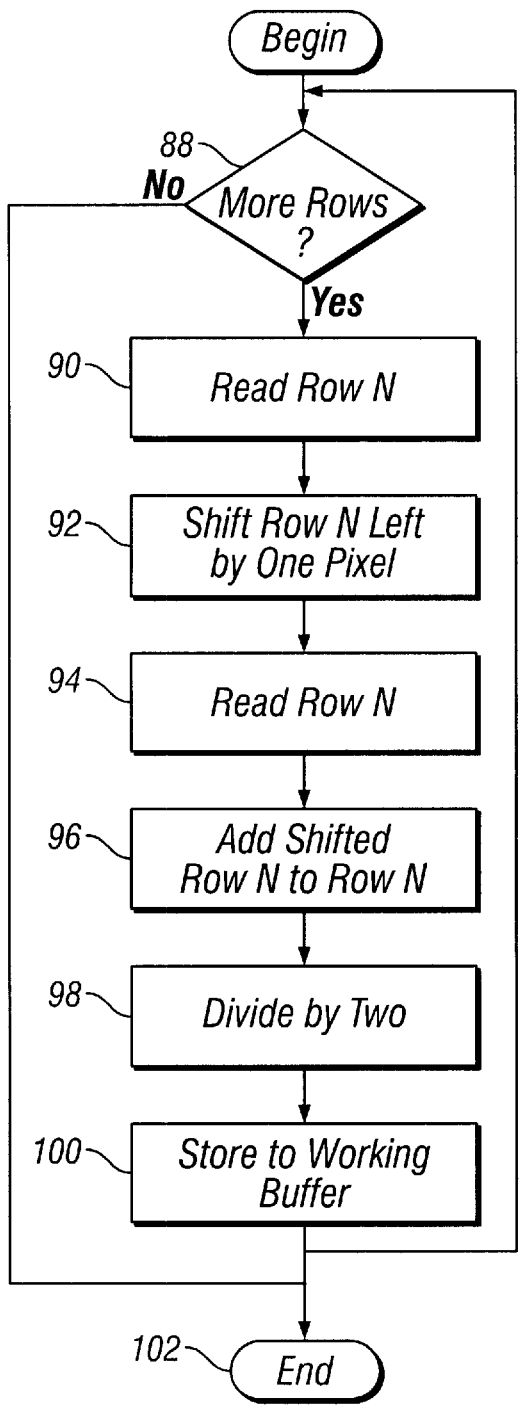
FIG. 8 is a flow diagram illustrating horizontal half pel compensation in accordance with the present invention.

Turning now to FIG. 8, a method for half pet compensation in the horizontal direction is illustrated. The method performs horizontal half pet compensation by adding a row of pixels to the same row shifted left by one pixel and dividing the resultant pixel values by two. At reference numeral 88, a check is made to determine whether another row should be read. If no more rows should be read, execution ends at reference numeral 102. If another row must be read, it is read at reference numeral 90. At reference numeral 94, the row of pixels is shifted left by one pixel. At reference numeral 96, the same row is read again. At reference numeral 98, the pixel values in the unshifted row and the shifted row are added together. At reference numeral 98, the summed pixel values are divided by two. The result of the division is stored in the working buffer at reference numeral 100.

Figure 9:
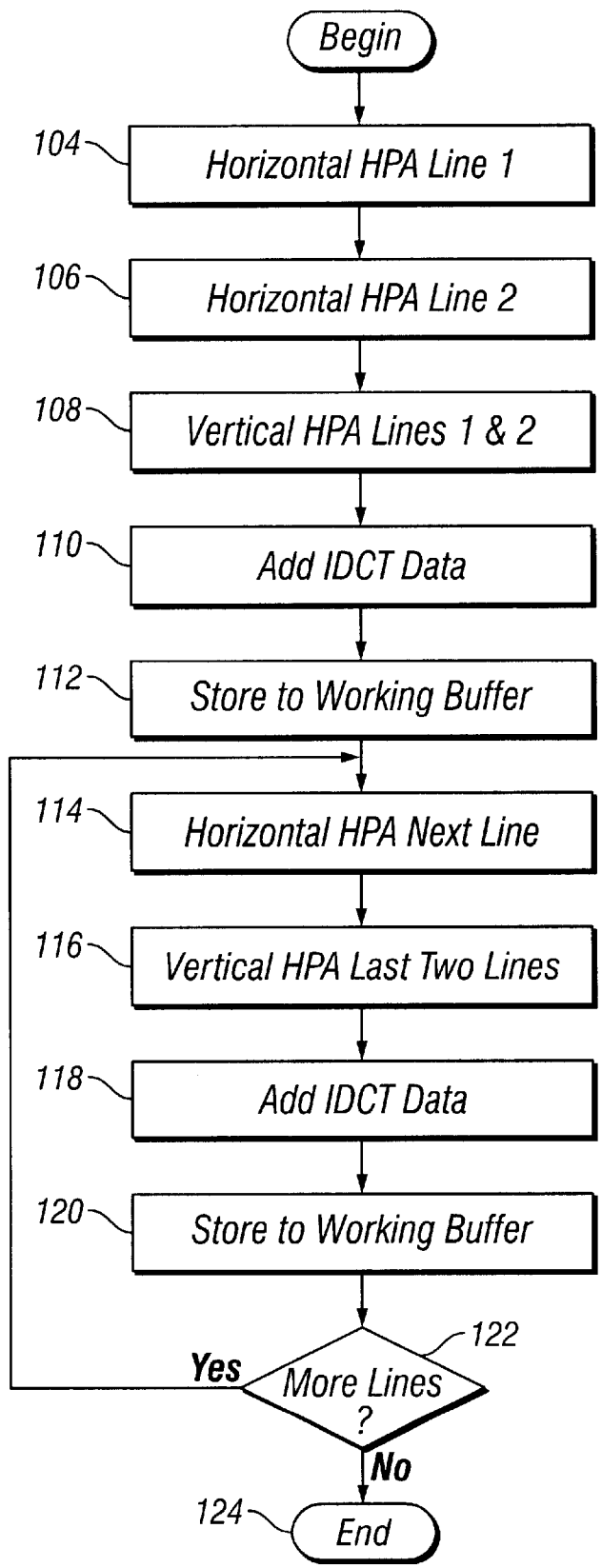
FIG. 9 is a flow diagram illustrating interleaved horizontal and vertical half pel compensation in accordance with the present invention.

According to one embodiment, if both horizontal and vertical half pel compensation are required, horizontal half pel compensation is interleaved with vertical half pel compensation. This is illustrated in FIG. 9. At reference numerals 104 and 106, horizontal pixel compensation is performed on lines one and two, respectively. At reference numeral 108, vertical pixel compensation is performed by adding the results of reference numerals 104 and 106 and dividing the sum by two. At reference numeral 110, the IDCT data for the first line is added to the result of reference numeral 108. At reference numeral 112, the result of reference numeral 110 is stored to the working buffer.

Half pel compensation for subsequent lines starts at reference numeral 114, where horizontal half pel compensation is performed for the next line. At reference numeral 116, the results of the last two horizontal pixel compensations are used to create the next vertical half pel result. At reference numeral 118, IDCT data is added to the last vertical half pel result. At reference numeral 120, the result is stored to the working buffer. At reference numeral 122, a check is made to determine whether more lines remain. If more lines remain, execution continues at reference numeral 114. Otherwise, execution terminates at reference numeral 124.

Figure 10:
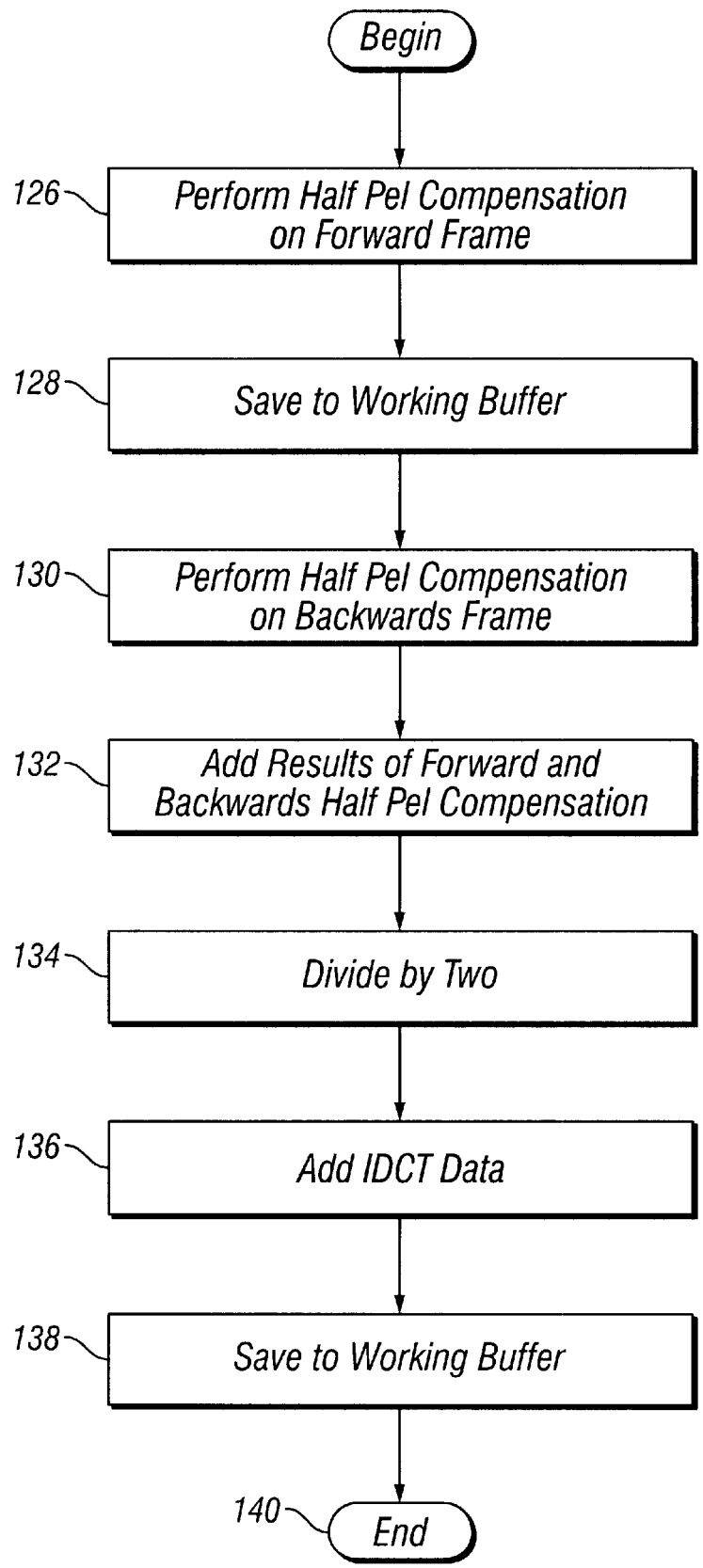
FIG. 10 is a flow diagram illustrating bidirectional motion compensation in accordance with the present invention.

Turning now to FIG. 10, a method for bidirectional prediction in accordance with the present invention is presented. The method performs bidirectional prediction by performing motion compensation on a forwards and a backwards frame and averaging both of the frames. At reference numeral 126, half pel compensation is performed on the forward frame. The result is saved to the working buffer at reference numeral 128. At reference numeral 130, half pel compensation is performed on the backwards frame. Half pel compensation for both frames is done according to the method discussed above. At reference numeral 132, the results of the forward and backwards half pel compensation are added together. At reference numeral 134, summed results are divided by two. At reference numeral 136, IDCT difference data is added. The result is stored in the working buffer at reference numeral 138.

The motion compensation engine may accept either frame-based macroblocks, or field-based macroblocks. Frame-based macroblocks contain information for consecutive rows within a full image. Field-based macroblocks contain information for alternating rows within an image. The motion compensation engine may also accept Dual Prime macroblocks, which are macroblocks that contain consecutive lines from different sources. Whether a macroblock contains frame, field, or dual prime based macroblocks affects how the motion compensated information is written to the working buffer.

Figure 11:
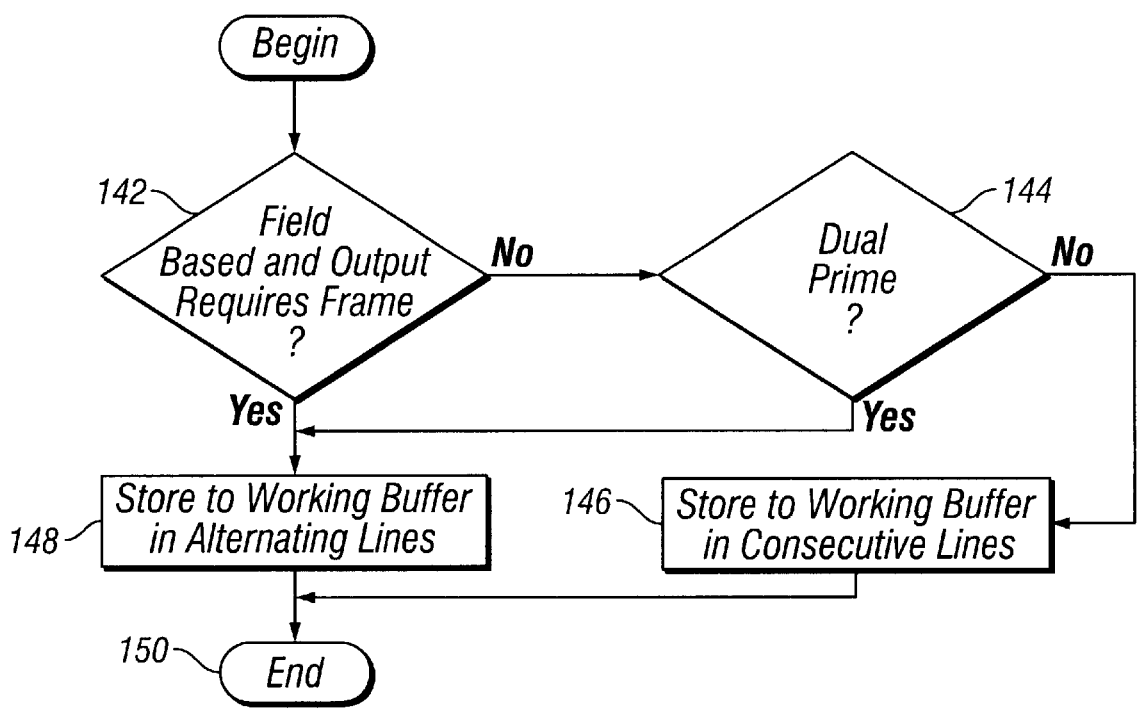
FIG. 11 is a flow diagram illustrating the storage of data to the working buffer in accordance with the present invention.

Referring now to FIG. 11, a method for storing motion compensated data to the working buffer is presented. At reference numeral 142, a check is made to determine whether the macroblock is field based and whether frame based output is required. If both conditions are true, the motion compensated data is stored to the working buffer in alternating locations at reference numeral 148, depending upon whether the data came from an odd or even line. If the macroblock is not field based or if frame based output is not required, a check is made to determine whether the current macroblock is dual prime based at reference numeral 144. If the current macroblock is dual prime based, the motion compensated block is stored at alternating locations at reference numeral 148, depending upon the data source. At reference numeral 146, if the macroblock is not dual prime based, the macroblock data is stored at consecutive locations in the working buffer.

After motion compensation has been performed, the data is optionally reduced. As mentioned above, one embodiment employs power of two data reduction. The reduction may be in the vertical direction, in the horizontal direction, or both. The power of two reduction is described in a commonly assigned, copending U.S. application Ser. No. 09/205,643, filed Dec. 3, 1998 by Ying Cui, for APPARATUS AND METHOD FOR REDUCING VIDEO DATA.

Turning now to reference numeral 12, power of two reduction is illustrated. At reference numeral 152, a macroblock is read from the working buffer. At reference numeral 154, a check is made to determine whether power of two reduction in the vertical direction is required. If vertical reduction is not required, execution continues at reference numeral 158. If vertical reduction is required, it is performed at reference numeral 156. At reference numeral 158, a check is made to determine whether power of two reduction in the horizontal direction is required. If horizontal reduction is not required, execution terminates at reference numeral 164. If horizontal reduction is required, it is performed at reference numeral 160. The reduced data is written to the working buffer at reference numeral 164.

Referring again to FIG. 4, color format conversion is performed at reference numeral 46. According to one embodiment YUV 4:2:0 data is reformatted to YUV 4:2:2 data. This method of color format conversion is commonly known and will not be discussed further to prevent obscuring the present invention.

Figure 13A:
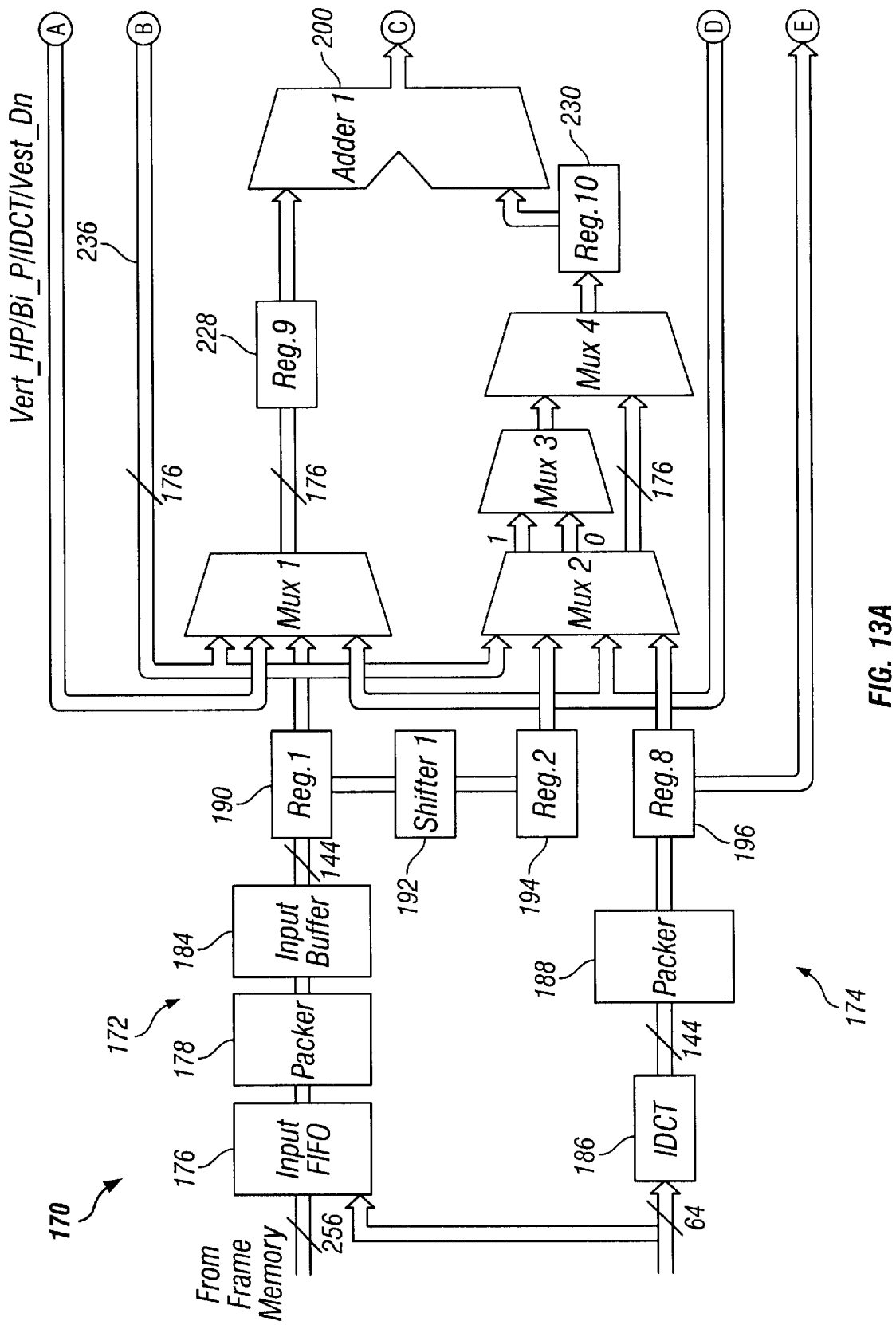
FIG. 13 is a detailed block diagram illustrating one embodiment of the present invention.
Figure 13B:
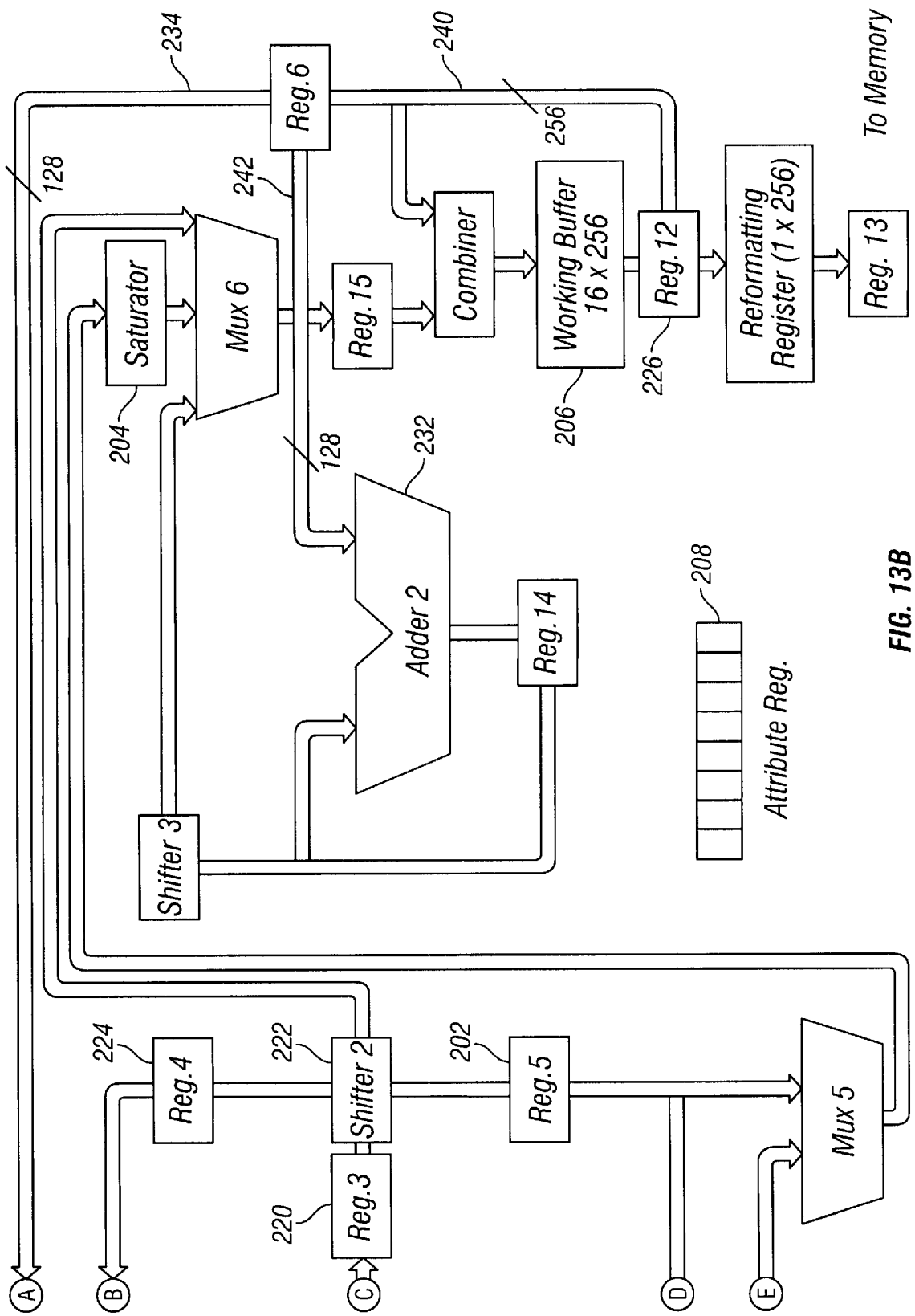

Referring now to FIG. 13, a block diagram of one embodiment of the present invention is presented. The Motion Compensation Unit 170, hereinafter referred to as MCU 170, has two input paths, referenced by 172 and 174. Memory is arranged into 16-byte columns. A memory sequencer fetches a macroblock from frame memory. The inputs to the memory sequencer are row number and column.

Figure 12:
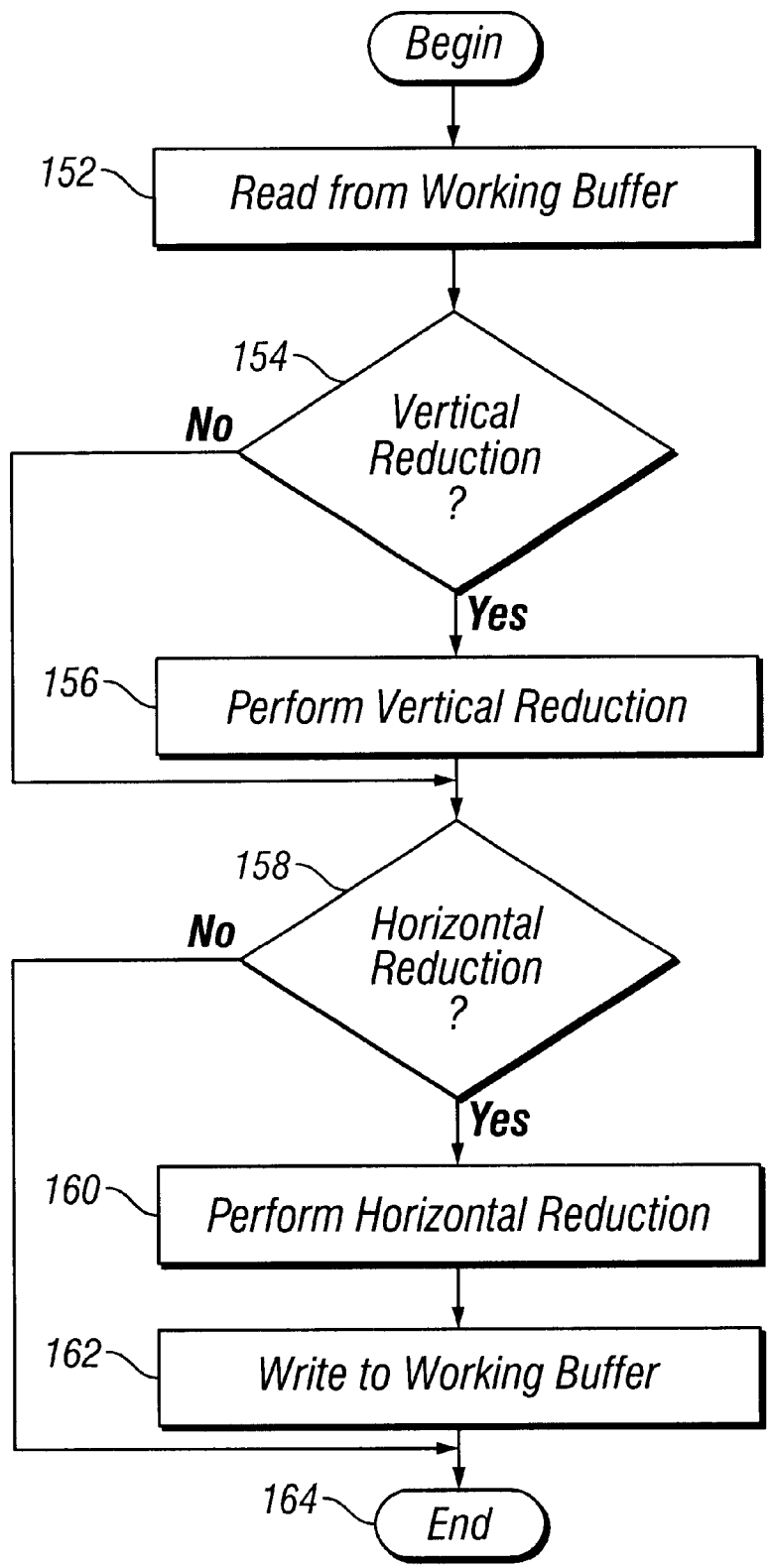
FIG. 12 is a flow diagram illustrating power of two reduction in accordance with one embodiment of the present invention.
Figure 14:
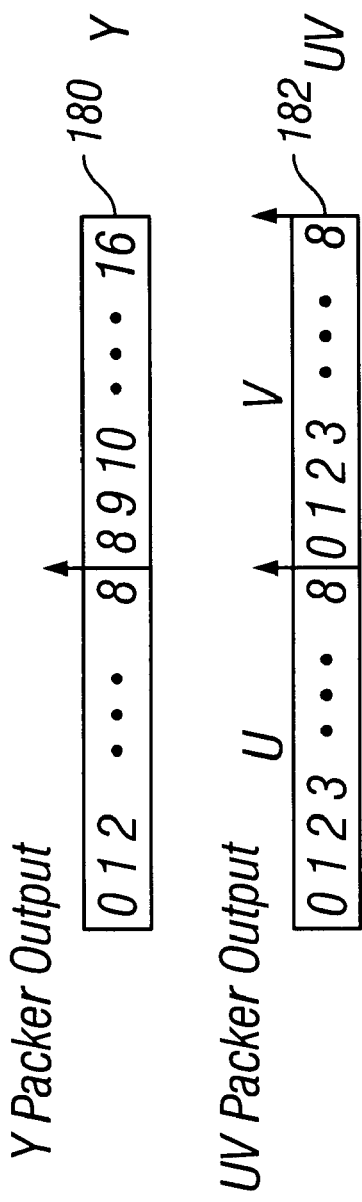
FIG. 14 is a block diagram illustrating the operation of an input data packer in accordance with one embodiment of the present invention.

According to one embodiment, FIFO 176 receives 32 bytes at a time. The FIFO 176 is large enough to hold one line. The input data is in YUV 4:2:0 or YUV 4:2:2 format. The FIFO 176 sends its data to a packer 178, which reformats the data into a format acceptable to the MCU 170. The output of the packer is illustrated in FIG. 14. The packer output format for luminance data is shown at reference numeral 180. The output format for chrominance data is shown at reference numeral 182. Referring to FIG. 12, the packer deposits one macroblock of the reformatted data in an input buffer. The other input comes from an IDCT unit 186. A second packer 188 reformats the IDCT difference data supplied by the IDCT unit 186 into a format acceptable by the MCU 170.

An attribute register 208 contains information about the current macroblock. This information includes whether the macroblock is an I, B, or P macroblock, whether the macroblock is frame-based, field-based or dual prime based, and whether vertical or horizontal half pel compensation is required.

For P frames requiring no half pel compensation, the first 18-byte line of a macroblock is presented to a first register 190 and the corresponding IDCT difference data from the IDCT unit 186 is presented to an eighth register 196. A first adder 200 adds the first register 190 and the eighth register 196 and deposits the results in a fifth register 202. The contents of the fifth register 202 are passed through a saturator 204. The saturator 204 performs a saturation function to ensure the data value is represented by eight bits. The saturated values are written to the working buffer 206. This process is repeated for all macroblock lines.

The above process has the advantage of requiring only eight memory clocks per 8×8 block and only sixteen memory clocks per 16×16 block. It accomplishes this by having an architecture which allows handling sixteen pixels every memory clock.

According to one embodiment, the working buffer 206 is a RAM memory organized as sixteen banks of 256-bit memories. This provides the capability of storing two sixteen 16×16 macroblocks. The size of the working buffer allows the storing of two 16×16 macroblocks and intermediate data for motion compensated macroblocks.

Figure 15:
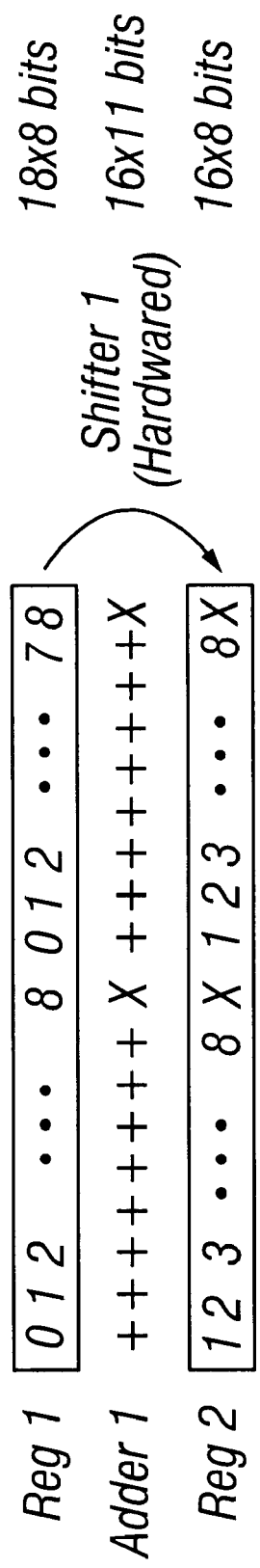
FIG. 15 is a block diagram illustrating the operation of a shifter in accordance with the present invention.

Horizontal half pel compensation is performed as follows. An 18-byte line of macroblock data is read into the first register 190. This is illustrated in FIG. 15. A first shifter 192, which may be configured to shift data left by zero or one pixels, shifts the data in the first register 190 left by one pixel. The result is stored in the second register 194. The first adder 200 adds the data from the first register 190 and the data from the second register 194 and the result is stored in a third register 220. Next, a second shifter 222, which may be configured to shift right by 0, 1, 2 or 3 bits, shifts the data right by one bit. This process is repeated for all macroblock lines. The result is stored in the working buffer 206.

The above process has the advantage of requiring only sixteen memory clocks per 8×8 block and only thirty two memory clocks per 16×16 block. It accomplishes this by having an architecture which allows handling sixteen pixels every memory clock.

Vertical half pel compensation is performed as follows. An 18-byte line of macroblock data is read into the first register 190. The value in the first register 190 is sent unshifted to the second register 194. Next, the first adder 200 adds the data from the first register 190 and the data from the second register 194. The result of the addition is stored in the third register 220. Next, the second shifter 222 shifts the data right by one bit. The result is stored in the working buffer 206. This process is repeated for all macroblock lines.

The above process has the advantage of requiring only seventeen memory clocks per 8×8 block and only thirty four memory clocks per 16×16 block. It accomplishes this by having an architecture which allows handling sixteen pixels every memory clock.

If both horizontal and vertical half pel compensation is required, it is performed as follows. Horizontal half pel compensation is performed on the first and second lines, as indicated above. The result of the compensated first line is stored in a fourth register 224 and the result of the compensated second line is stored in the fifth register 202. Next, vertical half pel compensation is performed on the compensated first line and the compensated second line. Next, IDCT difference data from the IDCT unit 186 is added to the result of the vertical half pel compensation. The result is stored in the working buffer 206. Next, half pel compensation is performed on the third line and the result is stored in the fourth register 224. Next, vertical half pel compensation is performed on the compensated second line and the compensated third line. Next, IDCT difference data from the IDCT unit 186 is added to the result of the half vertical half pel compensation. The result is stored in the working buffer 206. This process is repeated for the remainder of macroblock lines.

In the interleaved horizontal and vertical half pel compensation example described above, IDCT data was added after the creation of each half pel reduced line. According to another embodiment, interleaved vertical and half pel compensation is performed and then saved to the working buffer as each half pel compensation is completed. Next, IDCT difference data from the IDCT unit 186 is added to the half pel compensated data stored in the working buffer 206.

According to another embodiment, one type of half pel compensation is performed on all macroblock lines and the result is stored to the working buffer 206. Next, the other type of half pel compensation is performed on the result stored in working memory. Next, IDCT difference data from the IDCT unit 186 is added to the vertical and horizontally half pel compensated block. Next, the result is stored to the working buffer 206.

If the macroblock being processed is a "B" macroblock, the backward and forward macroblocks must be averaged, as indicated above. Both the forward and the backwards frame are independently processed with respect to half pel compensation. The results of each are stored to the working buffer 206. Next, the first line from the motion compensated backwards frame is presented to a twelfth register 226 and subsequently to a ninth register 228. The first adder 200 adds the ninth register 228 and the tenth register 230, which is initialized to zero. The output of the first adder 200 is presented to the fourth register 224 and subsequently to the tenth register 230. The first line from the motion compensated forward frame is presented to the twelfth register 226 and subsequently to the ninth register 228. The first adder 200 adds the ninth register 228 and the tenth register 230 and stores the result in the third register 230. The second shifter 222 right shifts the: data in the third register 220 by one bit, thus dividing the contents by two. The result is stored in the working buffer 206.

After motion compensation has been performed, a macroblock may be reduced by a power of two. Vertical and horizontal power of two reduction may be performed separately or independently. Vertical reduction is performed by the logic associated with the first adder 200. Horizontal reduction is performed by the logic associated with a second adder 232. The motion compensation and power of two reduction functions use much of the same hardware.

Power of two vertical reduction is performed as follows. A block is stored in the working buffer 206. The first macroblock line is sent over bus 234 to the ninth register.

Bus 234 is 128 bits wide, allowing one 16-byte macroblock line. Next, the first adder 200 adds the ninth register 228 and the tenth register 230, which is initialized to zero. The result is sent unshifted via bus 236 to the tenth register 230. The second macroblock line is sent over bus 234 to the ninth register 228. Next, the first adder 200 adds the contents of the ninth 228 and tenth 230 registers and stores the result in the third register 220. The contents of the third register 220 are passed through the second shifter 222, which is configured to shift each of the pixel values right by a number of bits based on the reduction scale. If the reduction scale is 2:1, the second shifter 222 is configured to shift the pixels right by one bit and the result is saved in the working buffer 206.

Vertical reduction scales greater than 2:1 are performed as follows. The first two macroblock lines are added as indicated above, except that the result is not right shifted. Instead, the result is passed over bus 236 to the tenth register. The third line is read from the working buffer 206 and deposited in the ninth register 228. The ninth register 228 and the tenth register 230 are added together and the unshifted result is sent again over bus 236 to the ninth register 228. The process continues until the required number of lines have been added. For a reduction scale of $2^n$:1, the required number of lines is $2^n$. When the required number of lines have been added, the output of the first adder 200 is sent to the second shifter 222, where each pixel value is right shifted n bits, n being the power of two reduction scale. The result is stored in the working buffer 206.

Horizontal reduction is performed as follows. A macroblock is stored in the working buffer 206. A macroblock line is sent over bus 240 and bus 242 second adder 232. Each line of data is reduced by a power of two. This is done by summing a number of adjacent pixels and right shifting the result by a number of bits. Both the number of pixels summed and the number of bits shifted are based on the horizontal reduction scale. For example, 2:1 horizontal reduction of a 16-byte line is performed by summing eight pairs of adjacent pixels and right shifting each result by one bit, creating an 8-byte resultant line. The operation of the horizontal reduction unit is described more fully in copending U.S. application Ser. No. 09/205,643, filed Dec. 3, 1998 by Ying Cui, for APPARATUS AND METHOD FOR REDUCING VIDEO DATA. After a line is horizontally reduced, it is stored in the working buffer 206.

The combination of motion compensation, power of two reduction and color format conversion has several advantages. Using the same hardware for multiple functions reduces the number of gates, reducing cost. The three functions are also located within the same unit and interface only through the working buffer, thus reducing frame memory accesses. The present invention also has the advantage of performing data reduction following motion compensation, rather than immediately prior to display. This reduces the amount of data that must -be written to and read from frame memory during subsequent video processing.

According to a presently preferred embodiment, the present invention may be implemented in software or firmware, as well as in programmable gate array devices, ASIC and other hardware.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An integrated circuit, comprising:
 a motion compensator for creating motion compensated data from video blocks and difference data;
 a reducer coupled to said motion compensator for reducing said motion compensated data to create reduced data;
 a color format converter coupled to said reducer for converting the color format of said reduced data to create reformatted data;

an interface to a first memory;
a second memory adapted to receive a plurality of a video blocks from said interface, said second memory coupled to said motion compensator;
a third memory adapted to store difference data corresponding to said video blocks, said third memory coupled to said motion compensator; and
a fourth memory coupled to said color format converter, said reducer and said motion compensator.

2. The integrated circuit according to claim 1 wherein said first memory is a frame memory;
said reducer employs power of two reduction;
said interface to said first memory comprises a FIFO; and
said color format converter converts YUV 4:2:0 data to YUV 4:2:2 data.

3. The integrated circuit according to claim 2 wherein said motion compensator stores intermediate data and final results to said fourth memory;
said reducer stores intermediate data and final results to said fourth memory; and
said color format converter stores intermediate data and final results to said fourth memory.

4. The integrated circuit according to claim 3 wherein said reducer comprises a power of two reducer.

5. The integrated circuit according to claim 4 wherein said color format converter converts YUV 4:2:0 data to YUV 4:2:2 format;
said motion compensator performs motion compensation for P and B frames; and
said motion compensator performs half pel compensation for P and B frames.

6. The integrated circuit according to claim 5 wherein said second memory is a 256-bit RAM.

7. A computer system, comprising:
a bus; and
a video processor coupled to said bus, said video processor comprising:
an interface to a first memory;
a second memory adapted to receive a plurality of a video blocks from said interface;
a third memory adapted to store difference data corresponding to said video blocks;
a motion compensator coupled to said second memory and said third memory for creating motion compensated data from said video blocks and said difference data;
a video data reducer coupled to said motion compensator for reducing data to create reduced data, said reducer employing power of two reduction;
a color format converter coupled to said reducer for converting the color format of said reduced data in YUV 4:2:0 format to create reformatted data in YUV 4:2:2 format; and
a fourth memory coupled to said color format converter, said reducer and said motion compensator for receiving said reformatted data.

8. The computer system according to claim 7 wherein said first memory is a frame memory; and
said interface to first memory comprises a FIFO.

9. The computer system according to claim 8 wherein said motion compensator stores intermediate data and final results to said fourth memory;
said power of two reducer stores intermediate data and final results to said fourth memory; and
said color format converter stores intermediate data and final results to said fourth memory.

10. The computer system according to claim 9 wherein said motion compensator performs motion compensation for P and B frames; and
said motion compensator performs half pel compensation for P and B frames.

11. The computer system according to claim 10 wherein said fourth memory is a 256-bit RAM.

12. A method for manipulating video data, comprising:
receiving video data;
formatting said video data into a first block, comprising:
changing the color format from YUV 4:2:0 to YUV 4:2:2; and
interleaving luminance data and chrominance data;
performing motion compensation on said first block to create a second block, comprising:
determining whether said first block is from an "I" frame;
determining whether said first block is from a "B" frame when said first block is not from an "I" frame;
performing bidirectional prediction when said first block is from a "B" frame;
performing half pel compensation when said first block is not from an "I" frame or a "B" frame; and
adding difference data to the result of said half pel compensation;
performing power of two data reduction on said second block to create a third block;
reformatting said third block to create a fourth block; and
storing said fourth block to a memory.

13. The method according to claim 12 wherein said power of two data reduction comprises:
reading an unreduced block from a working memory;
determining whether power of two vertical reduction is required;
performing power of two vertical reduction when power of two vertical reduction is required;
determining whether power of two horizontal reduction is required;
performing power of two horizontal reduction when power of two horizontal reduction is required; and
storing the result of said vertical and horizontal power of two reduction to said working memory.

14. The method according to claim 13 wherein storing said fourth block to a memory comprises:
determining whether said fourth block is field based and frame based output is required;
determining whether said fourth block is dual prime based;
storing lines of said fourth block to said working buffer at alternating lines when said fourth block is field based and frame based output is required;
storing lines of said fourth block to said working buffer at alternating lines when said fourth block is dual prime based; and
storing lines of said block to said working buffer at consecutive lines when said fourth block is frame based.

15. The method according to claim 14 wherein said half pel compensation comprises:
determining whether horizontal half pel compensation is required;

performing horizontal half pel compensation when required;
determining whether vertical half pel compensation is required; and
performing vertical half pel compensation when required.

16. The method according to claim 15 wherein
said horizontal half pel compensation comprises:
  determining whether more rows should be read;
  reading a row into a first row memory when another row should be read;
  shifting said first row memory left by one pixel;
  reading said row a second time into a second row memory;
  adding said first row memory and said second row memory to create a first row sum;
  dividing each element of said first row sum to create a horizontal half pel result; and
  storing said horizontal half pel result to said working memory; and
said vertical half pel compensation comprises
  determining whether more rows should be read;
  reading a row into a third row memory when another row should be read;
  reading the next row into a fourth row memory when another row should be read;
  adding said third row memory and said fourth row memory to create a second row sum;
  dividing each element of said second row sum to create a vertical half pel result; and storing said vertical half pel result to said working memory.

17. The method according to claim 16 wherein said bidirectional prediction comprises:
  performing half pel compensation on a forward frame to create a first half pel result;
  saving said half pel result to said working buffer;
  performing half pel compensation on a backwards frame to create a second half pel result;
  adding said first half pel result and said second half pel result to create a third half pel result;
  dividing said third half pel result by two to create a fourth half pel result;
  adding difference data and said fourth half pel result to create a fifth half pel result; and
  saving said fifth half pel result to said working buffer.

18. A program storage device readable by a machine, tangibly embodying a program of instructions executable by the machine to manipulate video data, comprising:
  a first module comprising code for causing a machine to read video data;
  a second module comprising code for causing a machine to format said video data into a macroblock;
  a third module comprising code for causing a machine to perform motion compensation on said macroblock to create a compensated block, said motion compensation comprising:
    determining whether said macroblock is from an "I" frame;
    determining whether said macroblock is from a "B" frame when the macroblock is not from an "I" frame;
    performing bidirectional prediction when said macroblock is from a "B" frame; and
    performing half pel compensation when said macroblock is not from an "I" frame or a "B" frame; and
    adding difference data to the result of said half pel compensation;
  a fourth module comprising code for causing a machine to perform power of two data reduction on said compensated block to create a reduced block; and
  a fifth module comprising code for causing a machine to reformat said reduced block to create a reformatted block and store said reformatted block to a memory, said reformatting comprising:
    changing the color format from YUV 4:2:0 to YUV 4:2:2; and
    interleaving luminance data and chrominance data.

19. A program storage device according to claim 18 wherein said power of two data reduction comprises:
  reading an unreduced block from a working memory;
  determining whether power of two vertical reduction is required;
  performing power of two vertical reduction when power of two vertical reduction is required;
  determining whether power of two horizontal reduction is required;
  performing power of two horizontal reduction when power of two horizontal reduction is required; and
  storing the result of said vertical and horizontal power of two reduction to said working memory.

20. The program storage device according to claim 19 wherein storing said reformatted block to a memory comprises:
  determining whether said block is field based and frame based output is required;
  determining whether said block is dual prime based;
  storing lines of said block to said working buffer at alternating lines when said block is field based and frame based output is required;
  storing lines of said block to said working buffer at alternating lines when said block is dual prime based; and
  storing lines of said block to said working buffer at consecutive lines when said block is frame based.

21. The program storage device according to claim 20 wherein said half pel compensation comprises:
  determining whether horizontal half pel compensation is required;
  performing horizontal half pel compensation when required;
  determining whether vertical halfpel compensation is required; and
  performing vertical half pel compensation when required.

22. The program storage device according to claim 21 wherein said horizontal half pel compensation comprises:
  determining whether more rows should be read;
  reading a row into a first row memory when another row should be read;
  shifting said row memory left by one pixel;
  reading said row a second time into a second row memory;
  adding said first row memory and said second row memory to create a first row sum;
  dividing each element of said first row sum to create a horizontal half pel result; and
  storing said horizontal half pel result to said working memory; and
said vertical half pel compensation comprises
  determining whether more rows should be read;
  reading a row into a third row memory when another row should be read;

reading the next row into a fourth row memory when another row should be read;

adding said third row memory and said fourth row memory to create a second row sum;

dividing each element of said second row sum to create a vertical half pel result; and storing said vertical half pel result to said working memory.

23. The program storage device according to claim 22 wherein said bidirectional prediction comprises:

performing half pel compensation on a forward frame to create a first half pel result;

saving said half pel result to said working buffer;

performing half pel compensation on a backwards frame to create a second half pel result;

adding said first half pel result and said second half pel result to create a third half pel result;

dividing said third half pel result by two to create a fourth half pel result;

adding IDCT difference data and said fourth half pel result to create a fifth half pel result; and saving said fifth half pel result to said working buffer.

24. An apparatus for manipulating video data, comprising:

means for receiving video data;

means for formatting said video data into a first block, comprising:

means for changing the color format from YUV 4:2:0 to YUV 4:2:2; and means for interleaving luminance data and chrominance data;

means for performing motion compensation on said first block to create a second block, comprising:

means for determining whether said first block is from an "I" frame;

means for determining whether said first block is from a "B" frame when said first block is not from an "I" frame;

means for performing bidirectional prediction when said first block is from a "B" frame;

means for performing half pel compensation when said first block is not from an "I" frame or a "B" frame; and means for adding difference data to the result of said half pel compensation;

means for performing power of two data reduction on said second block to create a third block;

means for reformatting said third block to create a fourth block; and means for storing said fourth block to a memory.

25. The apparatus according to claim 24 wherein said means for performing power of two reduction comprises:

means for reading an unreduced block from a working memory;

means for determining whether power of two vertical reduction is required;

means for performing power of two vertical reduction when power of two vertical reduction is required;

means for determining whether power of two horizontal reduction is required;

means for performing power of two horizontal reduction when power of two horizontal reduction is required; and means for storing the result of said vertical and horizontal power of two reduction to said working memory.

26. The apparatus according to claim 25 wherein means for storing said fourth block to a memory comprises:

means for determining whether said fourth block is field based and frame based output is required;

means for determining whether said fourth block is dual prime based;

means for storing lines of said fourth block to said working buffer at alternating lines when said fourth block is field based and frame based output is required;

means for storing lines of said fourth block to said working buffer at alternating lines when said fourth block is dual prime based; and means for storing lines of said block to said working buffer at consecutive lines when said fourth block is frame based.

27. The apparatus according to claim 26 wherein said means for performing half pel compensation comprises:

means for determining whether horizontal half pel compensation is required;

means for performing horizontal half pel compensation when required;

means for determining whether vertical half pel compensation is required; and means for performing vertical half pel compensation when required.

28. The apparatus according to claim 27 wherein said means for performing horizontal half pel compensation comprises:

means for determining whether more rows should be read;

means for reading a row into a first row memory when another row should be read;

means for shifting said first row memory left by one pixel;

means for reading said row a second time into a second row memory;

means for adding said first row memory and said second row memory to create a first row sum;

means for dividing each element of said first row sum to create a horizontal half pel result; and means for storing said horizontal half pel result to said working memory; and said vertical half pel compensation comprises:

means for determining whether more rows should be read;

means for reading a row into a third row memory when another row should be read;

means for reading the next row into a fourth row memory when another row should be read;

means for adding said third row memory and said fourth row memory to create a second row sum;

means for dividing each element of said second row sum to create a vertical half pet result; and means for storing said vertical half pel result to said working memory.

29. The apparatus according to claim 28 wherein said means for performing bidirectional prediction comprises:

means for performing half pel compensation on a forward frame to create a first half pel result;

means for saving said half pel result to said working buffer;

means for performing half pel compensation on a backwards frame to create a second half pel result;

means for adding said first half pel result and said second half pel result to create a third half pel result;

means for dividing said third half pel result by two to create a fourth half pel result; means for adding difference data and said fourth half pel result to create a fifth half pel result; and means for saving said fifth half pel result to said working buffer.

30. An apparatus for manipulating video data, comprising:
means for receiving video data;
means for formatting said video data into a first block, comprising:
    changing the color format from YUV 4:2:0 to YUV 4:2:2 and
    interleaving luminance data and chrominance data;
means for performing motion compensation on said first block to create a second block, comprising:
    means for determining whether said first block is from an "I" frame;
    means for determining whether said first block is from a "B" frame when said first block is not from an "I" frame;
    means for performing bidirectional prediction when said first block is from a "B" frame;
    means for performing half pel compensation when said first block is not from an "I" frame or a "B" frame; and
    means for adding difference data to the result of said half pel compensation;
        means for performing power of two data reduction on said second block to create a third block;
        means for reformatting said third block to create a fourth block; and
        means for storing said fourth block to a memory.

31. The apparatus according to claim 30 wherein said means for performing power of two data reduction comprises:
    means for reading an unreduced block from a working memory;
    means for determining whether power of two vertical reduction is required;
    means for performing power of two vertical reduction when power of two vertical reduction is required;
    means for determining whether power of two horizontal reduction is required;
    performing power of two horizontal reduction when power of two horizontal means for reduction is required; and
    means for storing the result of said vertical and horizontal power of two reduction to said working memory.

32. The apparatus according to claim 31 wherein means for storing said fourth block to a memory comprises:
    means for determining whether said fourth block is field based and frame based output is required;
    means for determining whether said fourth block is dual prime based;
    means for storing lines of said fourth block to said working buffer at alternating lines when said fourth block is field based and frame based output is required;
    means for storing lines of said fourth block to said working buffer at alternating lines when said fourth block is dual prime based; and
    means for storing lines of said block to said working buffer at consecutive lines when said fourth block is frame based.

33. The apparatus according to claim 32 wherein said means for performing half pel compensation comprises:
    means for determining whether horizontal halfpel compensation is required;
    means for performing horizontal half pel compensation when required;
    means for determining whether vertical half pel compensation is required; and
    means for performing vertical half pel compensation when required.

34. The apparatus according to claim 31 wherein
said means for performing horizontal half pel compensation comprises:
    means for determining whether more rows should be read;
    means for reading a row into a first row memory when another row should be read;
    means for shifting said first row memory left by one pixel;
    means for reading said row a second time into a second row memory;
    means for adding said first row memory and said second row memory to create a first row sum;
    means for dividing each element of said first row sum to create a horizontal half Pel result; and
    means for storing said horizontal half pel result to said working memory; and
said means for performing vertical half pel compensation comprises:
    means for determining whether more rows should be read;
    means for reading a row into a third row memory when another row should be read;
    means for reading the next row into a fourth row memory when another row should be read;
    means for adding said third row memory and said fourth row memory to create a second row sum;
    means for dividing each element of said second row sum to create a vertical half pel result; and
    means for storing said vertical half pel result to said working memory.

35. The apparatus according to claim 34 wherein said means for performing bidirectional prediction comprises:
    means for performing half pel compensation on a forward frame to create a first half pel result;
    means for saving said half pel result to said working buffer;
    means for performing half pel compensation on a backwards frame to create a second half pel result;
    means for adding said first half pel result and said second half pel result to create a third half pel result;
    means for dividing said third half pel result by two to create a fourth half pel result;
    means for adding difference data and said fourth half pel result to create a fifth half pel result; and
    means for saving said fifth half pel result to said working buffer.

* * * * *

UNITED STATES PATENT AND TRADEMARK OFFICE
CERTIFICATE OF CORRECTION

PATENT NO.    : 6,552,749 B1
DATED         : April 22, 2003
INVENTOR(S)   : Morris E. Jones, Jr. et al.

Page 1 of 1

It is certified that error appears in the above-identified patent and that said Letters Patent is hereby corrected as shown below:

Column 1,
Line 23, replace "handles, data" with -- handles data --.
Line 47, replace "full-motion is video" with -- full-motion video --.

Column 5,
Lines 64 and 66, replace "pet" with -- pel --.

Column 10,
Line 45, replace "must -be" with -- must be --.

Column 16,
Line 54, replace "pet" with -- pel --.

Column 18,
Line 6, replace "halfpel" with -- half pel --.
Line 28, replace "Pel" with -- pel --.

Signed and Sealed this

Thirteenth Day of January, 2004

JON W. DUDAS
*Acting Director of the United States Patent and Trademark Office*